A. O. HIGINBOTHAM.
SPRING SUSPENSION FOR VEHICLES.
APPLICATION FILED AUG. 3, 1914.
1,210,311. Patented Dec. 26, 1916.
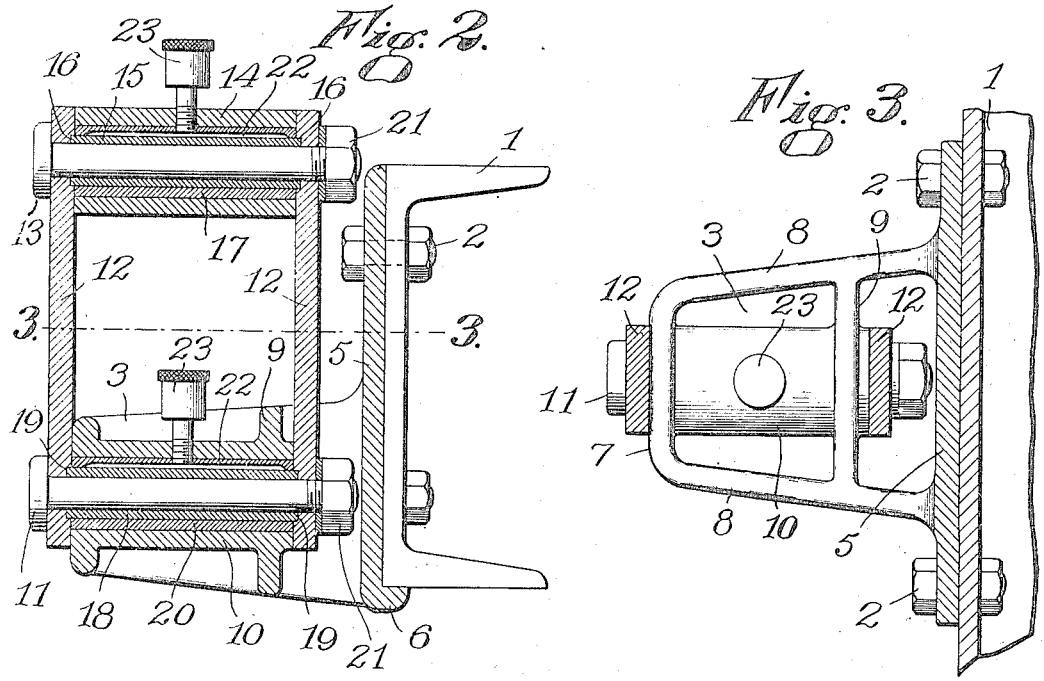
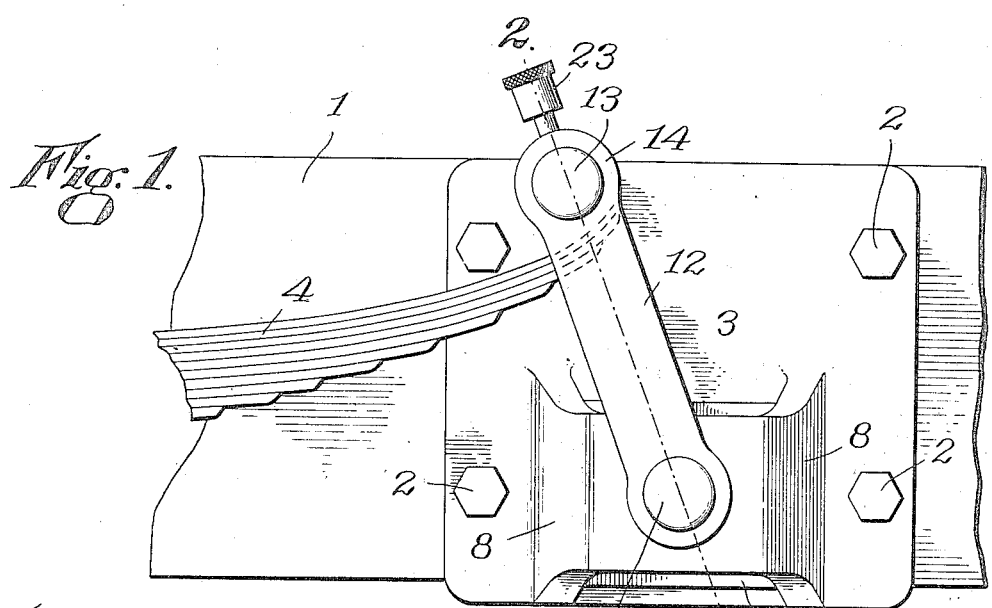
Witnesses.
R. D. Tolman.
Inventor
Arthur O. Higinbotham
By Fowler & Kennedy
Attorneys.

UNITED STATES PATENT OFFICE.

ARTHUR O. HIGINBOTHAM, OF WORCESTER, MASSACHUSETTS, ASSIGNOR TO CHARLES B. FOSTER AND COMPANY, OF WORCESTER, MASSACHUSETTS, A COPARTNERSHIP CONSISTING OF CHARLES B. FOSTER, ARTHUR O. HIGINBOTHAM, AND JEROME R. GEORGE.

SPRING SUSPENSION FOR VEHICLES.

1,210,311. Specification of Letters Patent. Patented Dec. 26, 1916.

Application filed August 3, 1914. Serial No. 854,629.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in Spring Suspension for Vehicles, of which the following, taken in connection with the accompanying drawings, is a specification.

The present invention relates to a new and improved spring suspension for vehicles, and is adapted particularly to a construction in which the frame members of the vehicle are pivotally hung from the ends of leaf springs carried by the axles.

An object of the invention is to provide a construction in which the pivot bolts for the links or shackles, which suspend the vehicle body from the spring, are relieved of shearing strains and are rendered free from wear.

Other and further objects will appear from the following description and the claim annexed thereto, reference being had to the accompanying drawings, in which—

Figure 1 is a view in side elevation of a construction embodying my invention. Fig. 2 is a section on line 2—2, Fig. 1. Fig. 3 is a section on line 3—3, Fig. 2.

Like reference characters refer to like parts in the different figures.

In the drawings, 1 designates one of the longitudinal frame members of a vehicle, to the side of which is secured, by means of bolts 2, a spring hanger designated as a whole by the numeral 3. In the structure illustrated in the drawings, a semi-elliptic leaf spring 4, of the type ordinarily employed in motor vehicles, is adapted to be connected at each end to a hanger, as shown for one end only in said drawings, and at its center said spring is supported by the axle of the vehicle, not shown. The spring hanger 3 comprises a plate 5 bolted flat against the side of the frame member, and preferably provided along its lower edge with a flange 6, forming a shoulder lying flush with the under side of the frame member.

Projecting outwardly from the plate 5 below its central portion is a vertically disposed substantially rectangular frame or bracket having its outer end 7 parallel to the plate 5 and its two sides 8, 8 substantially at right angles thereto. A vertical web 9, connecting the sides 8, 8 of the frame at a point adjacent to the plate 5, coöperates with the end 7 in supporting an integral tubular section 10, through which the usual bolt 11 carrying the spring shackles 12, 12 is passed. The shackles 12, 12 are connected at their other ends by a bolt 13, passing through the eye 14 of the spring 4 in the usual manner, whereby the pivotal suspension of the frame member 1 from the end of the spring 4 through the medium of the interposed shackles 12, 12 is effected. Instead, however, of hanging the shackles directly on the ends of bolt 13, beyond the ends of the spring eye 14, as in the ordinary practice, the bolt 13 is surrounded by a steel bushing 15, having its ends projecting beyond the ends of the spring eye, said ends entering counterbored recesses 16 of the shackles surrounding the bolt holes therethrough. A bronze bushing 17, having its ends flush with the ends of the spring eye, is interposed between said eye and the steel bushing 15. In a like manner, the bolt 11 has a surrounding steel bushing 18, the ends of which are received within the counterbored recesses 19 of the shackles 12, 12, and a bronze bushing 20 is provided between the steel bushing 18 and the tubular section 10 of the spring hanger 3.

In assembling the above described construction, the nuts 21 of said bolts are screwed up tightly thereon, forming in effect a stiff and rigid structural assembly of said bolts, steel bushings and shackles. This effect is possible because the steel bushings 15 and 18 constitute spacers, serving to maintain the shackles 12, 12 a sufficient distance apart to provide an easy running fit between the inner faces of said shackles and the ends of the tubular section 10 and spring eye 14, respectively, whereas in the ordinary construction, the tightening of the nuts on the pivot bolts causes the shackles to bind on the ends of the spring eye and spring hanger. The bolts 11 and 13 serve merely to bind the structure together and are not subject to the shearing effect of the shackles 12, 12, the same being exerted upon the ends of the steel bushings 15 and 18, which present a greater cross sectional area to resist said shear. Any wear occasioned by the relative vibrations of the spring and the vehicle body is always in the running joints between the steel bushings 15 and 18 and their surrounding bronze bushings 17 and 20 respectively and, for the purpose of minimizing this wear, each bronze bushing has an internal longitudinal groove 22, adapted to receive lubricant from a grease cup or other lubricating device 23 carried by the spring eye or spring hanger, as the case may be, and extending through said bushing.

The construction above described eliminates the cutting action of the shackles on the pivot bolts, and prevents looseness and rattling of the parts. The bolts, being free from wear, do not have to be replaced as in the ordinary construction; when wear occurs in the running joint between the steel bushing and the bronze bushings, either or both of said bushings can be renewed at a very low cost.

I claim,

In a spring suspension for vehicles, the combination, with a spring supporting member having a bore, of suspension devices for pivotal attachment to said spring supporting member at opposite ends of said bore, a bolt extending through said bore and through said suspension devices, a tubular member surrounding said bolt with its ends providing pivotal supports for said suspension devices, and an anti-friction bushing interposed between said tubular member and the bore of said spring supporting member.

Dated this 30th day of July 1914.

ARTHUR O. HIGINBOTHAM.

Witnesses:
  PENELOPE COMBERBACH,
  R. E. ATHERTON.